United States Patent [19]

Tarao et al.

[11] 4,133,755

[45] Jan. 9, 1979

[54] AGENT FOR REMOVING HEAVY METALS

[75] Inventors: Ryohkichi Tarao, Tokosuka; Kanji Kaku, Yokohama; Masaki Hayashi, Yokohama; Takao Nakamura, Yokohama; Shigeo Ohishi, Funabashi; Hajime Yamano, Tokyo, all of Japan

[73] Assignee: Chisso Corporation, Osaka, Japan

[21] Appl. No.: 818,650

[22] Filed: Jul. 25, 1977

[30] Foreign Application Priority Data

Jul. 26, 1976 [JP] Japan .................................. 51-88822
Jul. 29, 1976 [JP] Japan .................................. 51-90465
Jun. 2, 1977 [JP] Japan .................................. 52-65044

[51] Int. Cl.$^2$ .......................... C02B 1/42; B01J 31/02; C09K 3/00
[52] U.S. Cl. .................................. 210/38 B; 252/430; 252/428; 252/184
[58] Field of Search .................. 252/428, 430, 184; 210/38 B

[56] References Cited

FOREIGN PATENT DOCUMENTS 1961275  6/1971  Fed. Rep. of Germany .......... 252/184
4914315  2/1974  Japan.
5029481  3/1975  Japan.

*Primary Examiner*—Delbert E. Gantz
*Assistant Examiner*—William G. Wright
*Attorney, Agent, or Firm*—Fred Philpitt

[57] ABSTRACT

As an agent for removing heavy metals such as mercury from waste waters containing the same, a composition and granule based on the composition are provided. Also a method for preparing the granule is provided. The composition consists mainly of a dithiocarbamate bond-containing low molecular weight compound, amorphous silica and active carbon powder. The granule consists mainly of said composition and a vinyl acetate polymer resin as a binder. The method is carried out by kneading and extruding the composition of the granule together with a clay as an excipient. Treated water through said agent can pass the current very severe effluent standards.

21 Claims, No Drawings

AGENT FOR REMOVING HEAVY METALS

DESCRIPTION OF THE INVENTION

The present invention relates to an agent for removing heavy metals such as mercury, etc. from waste water containing the same or compounds thereof. More particularly, it relates to a composition for removing heavy metals by catching, a granulated product prepared from said composition and being widely usable commercially, and a process for preparing said granulated product by granulation.

Recently, problems of environmental pollution on account of waste water, commercially discarded materials, etc. have been raised. Particularly, treatment of waste water containing heavy metals such as mercury, etc. has been a very important problem. Thus, the administrative regulation of drainage have become severer year after year. For example, in case of mercury, 5 ppb has been required as its effluent standard, and 0.5 ppb, as its environmental quality standard.

Heretofore, as for an agent for removing heavy metals, a dithiocarbamate polymer consisting of a compound having a dithiocarbamate bond and expressed by a structural formula

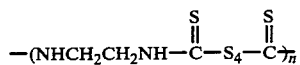

has been disclosed in Japanese patent application laid-open No. 29481/1975, but the polymer has great drawbacks in commercial uses since it has such undesirable properties that it is weak to heat (decomposition point: 127° C); there is no suitable solvent therefor; the amount of the component dissolving away into water is large; etc. Further, an example wherein the mercury-removabality of a low molecular weight compound having a dithiocarbamate bond (which will be hereinafter abbreviated as dithiocarbamate compound) was examined, has been disclosed therein, but a mercury ion concentration of 1 ppm in water was reduced only down to 0.011–0.0042 ppm, which are very insufficient as compared to the above-mentioned standard values. Since the above-mentioned compound is usually in the form of powder, batch operation is employed. Thus, when it is used for treating waste water containing mercury or the like, a hopper for adding powder, a stirring vessel, a precipitation vessel, a filter, etc. are required, and hence its application fields are restricted.

Further Japanese patent application laid-open No. 14315/1974 discloses an agent for removing heavy metals, having a metal sulfide, a dithiocarbamate compound, etc. adsorbed and carried on granular active carbon, but the amount thereof carried is only 0.001–1% by weight, and the mercury-adsorption capacity per unit weight is also very small. Thus it is also unsuitable for practical use. Further, as for its mercury-removability, a mercury ion concentration of 1.9 ppm in water is reduced only down to 0.02–0.005 ppm, and hence it cannot be said that such values are sufficient as compared to the above-mentioned standards.

Further, since the active carbon of the above-mentioned removing agent also adsorbs solvents in addition to the dithiocarbamate compound, it is difficult to adsorb and carry the dithiocarbamate compound in an amount of several % by weight or more, that is, it has a drawback that the amount carried is small. Its mercury adsorption capacity per unit weight is also small. Thus it has various disadvantages such that in order to allow a column having the removing agent filled therein to function so that the water quality of treated water can be maintained at a value lower than the effluent standard or the environmental quality standard, within the period of time during which it can endure practical use, a very large capacity is required for the column, and further that a waste removing agent having a trace of mercury adsorbed per unit weight of the agent for removing heavy metals occurs in a large amount.

The present inventors have made strenuous studies for overcoming the above-mentioned drawbacks of the prior art, and particularly have studied the adsorptivity of dithiocarbamate compounds upon heavy metals under various conditions, and as a result, have found that dithiocarbamate compound alone does not exhibit a remarkable heavy metals-catchability so much, whereas employment of said compound, amorphous silica and active carbon powder in admixture exhibits a very excellent heavy metals-catchability and the mixture is provided with properties suitable as an agent for removing heavy metals for commercial use, and thus have completed the present invention.

A first object of the present invention is to provide a composition having a superior heavy metals-removability i.e. catchability to those of the conventional compositions, by overcoming the above-mentioned drawbacks accompanying the conventional agent for removing heavy metals.

A second object of the present invention is to provide a practically usable granulated product of the agent for removing heavy metals (which will be hereinafter abbreviated as granulated product) making broader applications of the agent possible.

A third object of the present invention is to provide a method for preparing such a granulated product.

The composition of the present invention consists mainly of a dithiocarbamate compound, amorphous silica and active carbon powder. Further the granulated product of the present invention is the one obtained by blending and shaping a dithiocarbamate compound, active carbon powder and amorphous silica together with a binder composed mainly of vinyl acetate polymer resin and an excipient composed mainly of clay.

The granulation method of the present invention is carried out by blending a composition consisting of a dithiocarbamate bond-containing low molecular weight compounds, active carbon powder and amorphous silica with water, an excipient composed mainly of a clay and a binder composed mainly of vinyl acetate polymer resin to obtain a blend having a water content of 25–35%, which is then subjected to extrusion-granulation.

The blending ratio of a dithiocarbamate compound, amorphous silica and active carbon powder employed in the present invention can be selected optionally within a broad range, but it is particularly preferable that the ratio by weight of a dithiocarbamate compound to amorphous silica be in the range of 20:1 – 1:2 and the ratio by weight of a dithiocarbamate compound to active carbon powder be in the range of 10:1 – 1:10.

The dithiocarbamate compound employed in the present invention is preferably an alkyl-dithiocarbamate expressed by the following general formula:

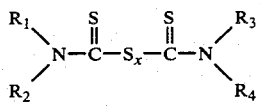

(wherein $R_1$, $R_2$, $R_3$ and $R_4$ are each, hydrogen atom or an alkyl having 1-3 carbon atoms, and ($R_1$ and $R_2$) and ($R_3$ and $R_4$) can form a ring together with the terminal nitrogen atom, respectively, and X is an integer of 1-4).

As for concrete compounds, those as shown in the following Table 1 can be illustrated:

Table 1

| Name | Abbreviation | Structural formula |
|---|---|---|
| Bis-dimethyl-thio-carbamoyl-monosulfide | TS | $\begin{array}{c} H_3C \\ \phantom{H_3C} \diagdown \\ \phantom{H_3C\diagdown}N-\overset{\overset{\displaystyle S}{\|}}{C}-S-\overset{\overset{\displaystyle S}{\|}}{C}-N \\ \phantom{H_3C} \diagup \phantom{xxxxxxxxxxxxx} \diagdown \\ H_3C \phantom{xxxxxxxxxxxxxxx} CH_3 \end{array}$ |
| Bis-diethyl-thio-carbamoyl-disulfide | TET | $H_5C_2\diagdown \phantom{xx} \overset{S}{\|} \phantom{xxx} \overset{S}{\|} \phantom{xx} \diagup C_2H_5$ N—C—S—S—C—N with $H_5C_2/$ and $\backslash C_2H_5$ |
| Bis-pentamethylene-thio-carbamoyl-tetrasulfide | TRA | (pentamethylene ring)—N—C(=S)—S—S—S—S—C(=S)—N—(pentamethylene ring) |
| Bis-dimethyl-thio-carbamoyl-disulfide | TMT | $H_3C\diagdown \phantom{xx}\overset{S}{\|}\phantom{xxx}\overset{S}{\|}\phantom{xx}\diagup CH_3$ N—C—S—S—C—N with $H_3C/$ and $\backslash CH_3$ |

These compounds are strong to heat, and it is possible to dissolve them in a suitable solvent, if necessary. Further they have other advantageous properties for the object of the present invention such that the amount of component dissolving away into water is extremely slight. Particularly TMT has been manufactured in a large amount and is cheap, which enables to obtain the aimed composition by employing this as a raw material and merely blending it with others. Thus, it is possible to provide a very economical product as compared to the cost of other agents for removing heavy metals on sale.

The amorphous silica employed in the present invention is in the form of powder or liquid colloid, and has a particle size of 0.01 - 300μ, preferably 0.01 - 74μ. Further, as for the active carbon employed in the present invention, those of any kinds currently known such as those originated from crushed coconut shell, coal, etc. or carbonized sawdust, etc. can be employed. The particle size is suitably 50 mesh or smaller, preferably 200 mesh or smaller.

As for the binder composed mainly of vinyl acetate polymer resin, employed in the present invention, aqueous suspension or emulsion of said resin can be mentioned. The concentration of vinyl acetate polymer resin in the binder is suitably selected preferably in the range of 30% - 50%, and as for the polymerization degree of the resin such as polyvinyl acetate is preferably in the range of 300-2000. Further, as for the vinyl acetate polymer resin, polyvinyl acetate and copolymers of vinyl acetate with vinyl chloride or ethylene or others such as acrylic acid, acrylic ester, fumaric acid, crotonic acid, etc. can be mentioned. The proportion of vinyl acetate in these copolymers is preferably 50% by weight or more.

The content of vinyl acetate polymer resin in the granulated product of the present invention is suitably in the range of 5-70%. In case of extrusion-granulation, 5-40% is preferable.

As for the binder of the present invention, an inorganic binder such as clay, diatomaceous earth, bentonite, talc, etc. can be added, if necessary. These materials enhance the strength of the product and extend the amount of the product and also function as a specific gravity-controlling agent.

As for the granulation of the granulated product of the present invention, there can be employed a method wherein a binder composed mainly of a vinyl acetate polymer resin e.g. in the form of aqueous suspension and the composition of the present invention are sufficiently blended together with a necessary amount of water added thereto, followed by drying and disintegration-granulation into a suitable particle size; a method wherein after said blending, the resulting blend is subjected to tumbling granulation to obtain a granular material having a desired particle size, followed by drying; a method wherein after said blending, the resulting blend is subjected to extrusion-granulation; and methods usually employed for granulation of powder. Among these methods, extrusion-granulation method is commercially desirable.

In case of the extrusion-granulation method, as for the blending of the composition, excipient and binder composed mainly of vinyl acetate polymer resin, any manners can be employed so long as uniform blending can be effected. For example, kneading by means of kneader, kneading by means of rubber kneading roll, kneading by means of blender, etc. are mentioned. The blending is preferably carried out so that the mixing ratio of the composition to the excipient can be in the range of 1:6 –6:2 and the binder composed mainly of vinyl acetate polymer resin can contain 5-40% (based on the % by weight of dried blend) of a vinyl acetate polymer resin. Further, the suitable amount of water at the time of extruding a blend obtained by this blending, i.e. the water content of the blend is preferably 25-35%, most preferably 28-32%. If the water amount is insufficient, the performance of the extruding treatment becomes poor and the shape of the extruded blend does not take a cylindrical form, but extrusion is carried out in a half-divided state (in a semicylindrical form). To the contrary, if the water amount is excessive, the amount to be treated increases and also a lower extrusion pressure is sufficient for the required one, but the resulting blend in the form of vermicelli just after extruded from a die mutually adheres or aggregates or is in a state deficient in formative stability. Thus granulation is impossible. In carrying out a practical granulation, it is possible to enhance the extrusion performance, e.g. by employing a slight excess of water amount or by blowing a hot air onto a part of the blend in the form of vermicelli just after extruded from the die.

The extrusion in the extrusion-granulation of the present invention can be carried out employing any known means, but a screw type extrusion is preferable and a screw type discharge extrusion is more preferable. This screw type discharge extrusion refers to a process of feeding a blend to a revolving screw inside the barrel of a screw extruder, forcibly forwarding it under compression by pressure and continuously extruding it through the die orifices attached to the tip end of die in the advancing direction of screw, more particularly a process wherein a scraper provided with several blades of reverse pitches to those of the screw is fixed between the screw and the die, and rotated in the same direction as that of the screw.

The excipient of the present invention can be selected from among those which are fine particles of mineral substances and exhibit a thixotropic phenomenon at the time of adding water and have a plasticity, and above all, those composed mainly of clay are most excellent in respect of plasticity. As for clays, alabaster group, kaolin group, sericite group, etc. are mentioned, but alabaster clay having about 2% of equilibrium water content after drying and washed clay having few content of impurities, particularly of total iron are preferable. The particle size is preferably in the range of $0.2-5\mu$. It is possible to substitute talc for clay. As compared to clay, granulated product having a higher non-swellability and a higher hardness can be obtained. Bentonite cannot be substituted for clay, but, by mixing 2 parts by weight or less with 10 parts by weight of clay, a granulated product having a superior heavy metals-catchability without losing water-resistant strength can be obtained.

The granulation of the present invention will be illustrated below by way of a granulation process employing a screw type extruder. The blend as a material to be extruded is dropped from a hopper into the forwarding end of a revolving screw driven by a motor inside a barrel; forwarded while being successively kneaded and compressed in the barrel; and finally continuously extruded through the die orifices provided at the tip end of the forwarding screw, in the form of vermicelli. Thereafter, granulation is carried out according to conventional method such as drying, disintegrating and face-smoothening of granule in sequence. For example, as for drying, high temperatures are avoided, and it is preferably carried out at a lower temperature. It is commercially desirable to employ a hopper dryer or the like. The blend in the form of vermicelli after drying is preferably cut uniformly to a suitable length depending upon the diameter of its cylinder. This purpose can be attained e.g. by employing a flash mill disintegrator or the like. As for the face-smoothening of granule after the disintegration, for example in case of a cylinder having a diameter of 1.0 mm, cylindrical granule of a uniform shape having a length of cylinder of 2-3 mm can be easily selected by employing an upper sieve of 12 mesh and a lower sieve of 20 mesh. The screw type extruder is of a discharge extrusion type, and those of biaxial, discharge extrusion type are preferable. The shape of screw is preferably such that as the screw forwards toward the tip end, the pitches of the blades become shorter, and also a screw having a construction capable of preventing co-rotation of material is preferable. The die has preferably a thickness of 3 mm or more in case of a diameter of 60 mm. The diameter of orifices is preferably 0.8-2.0 mm. The scraper functions so that the blend can be pushed back in the screw direction and also the dehydration of the blend just in front of the back surface of the die can be prevented. The functions of the composition of the present invention have the following specific features:

The composition reacts directly and easily with heavy metals contained in the aqueous solution; the adsorption rate thereof upon heavy metals is remarkably high; and the dithiocarbamate compound and the reaction metal complex thereof with heavy metas do not dissolve away into the solution to effect catching of heavy metals. Thus the composition can exhibit superior functions as an agent for removing heavy metals. Further since the amount of heavy metals caught per the unit weight of the composition is large, there is an advantage that the occurrence of waste agent for removing heavy metals is few.

The composition of the present invention has a high catchability upon mercury among heavy metals, i.e. a high mercury-removability. The mercury-catchability of dithiocarbamate compound alone is not so high, but, when it is mixed with amorphous silica and active carbon powder, it is surprising that the mercury-removability is greatly improved and the concentration of remaining mercury in the water treated is sufficiently below the effluent standard or the environmental quality standard. As compared to the performance anticipated from the respective mercury-catachabilities of dithiocarbamate compound, amorphous silica and active carbon powder prior to their mixing, a remarkably high performance is exhibited when they are mixed together and used. The reason is presumed as follows: The interaction between the mercury ion in the solution and the surface of dithiocarbamate compound may be physically promoted by the medium of amorphous silica and active carbon powder. Further the reason of this promotion due to the interaction is presumed as follows: The functional groups such as the silanol group on the surface of amorphous silica particles and the carboxyl group on the surface of active carbon powder particles have an affinity to water, which supplements the hydrophobic property of dithiocarbamate compound, which results in easiness of the mercury ion in the solution, of access to the surface of the dithiocarbamate compound.

The heavy metals-catchability of the granulated product of the present invention is superior to those of ungranulated powder composition, and exhibits a remarkably advanced performance over other known agents for removing heavy metals. Further, since the amount of heavy metals adhered per the unit weight of the granulated product is large, a small capacity is sufficient for the packed column, and also there is another advantage that the occurrence of waste agent for removing heavy metals is few.

The extrusion-granulation of the present invention has such specific features that a granulation method wherein few dusts occur is taken from the viewpoint of operational environment; and continuous granulation is possible; mixing and kneading after addition of the binder are simple; drying after the extrusion is simple to save time and operation; the stability of extrusion operation is better and the quality control is easy; operations for face-smoothening of granule, grading, etc. are unnecessary; the yeild is better; etc. Further, in the granulation of the present invention, if a scraper having reverse pitches is employed, the resulting kneading extent is much superior to those in case of conventional extrusion method.

The granulated product obtained according to the extrusion-granulation of the present invention has such advantageous properties that the heavy metals-catchability is superior; heavy metal ions once caught do not redissolve away into water; the granulated product is porous to make the permeation and diffusion of water and solute superior and also make the adsorption rate higher; the product has a suitable water-immersion strength i.e. water resistant property so that when employed in the water contained in the packed column, it does not collapse during the time of its use; it has a good water-wetting property and a suitable precipitating property; it has a good preservability prior to its use, and a suitable compression strength at the time of drying, which does not cause powdering during transportation and handling; etc.

As for the manner in which the composition of the present invention is employed, any one can be employed. For example, a manner of subjecting the composition to a treatment for removing heavy metals from waste water containing the same, in the form of powder as it is, in a batch type reactor to separate the composition having adsorbed heavy metals by means of aggregation-precipitation, or filtration or the like, a manner of adding a modifier to the composition to make it into a paste which is then mixed with a sludge, a waste mud or the like, and employing the resulting mixture as a fixing agent for preventing dissolving away, a manner of granulating the composition in a suitable manner and packing the resulting granule in a column, etc. can be mentioned.

As for the granulated product of the present invention, only packing or supplying it into a given treating apparatus is sufficient for treating industrial waste waters, and any particular equipment in addition to the packing column is unnecessary. For example, a manner of passing a waste water through a column in which the product has been packed, or a manner of packing the product in a first column, packing active carbon powder alone in a second column connected to the first column in series and passing a waste water through the first and second columns in this order, or the like manner, may be employed for the practical waste water treatment. Further, its recovery, exchange, etc. after its use are easy; it is very convenient at the time of handling operation as compared to the case of powder; and there is no fear that powders of dithiocarbamate compound, active carbon, etc. scatter as in the case of ungranulated product.

The present invention will be further illustrated below in details by way of Examples, without limiting the scope of the present invention thereto.

EXAMPLE 1

2.0 g of TMT (manufactured by Sanshin Kagaku, Japan), 0.5 g of amorphous silica (which will be hereinafter abbreviated merely as silica; the particle size being 74μ or smaller) and 2.5 g of active carbon (Tsurumi Coal PC, a trade name of active carbon powder) were blended to give a composition, which was then added to 200 ml of mercuric chloride aqueous solution ($Hg^{2+}$ concentration: 40 ppm). After stirring for 5 hours, filtration was carried out with No. 5C filter paper, and mercury contained in the resulting filtrate was analyzed to give a mercury concentration in the filtrate, of 0.2 ppb or lower.

(The mercury analysis was carried out by a measurement by means of a frameless atom absorptiometer according to JIS K 0102 (JIS: Japanese Industrial Standards). The analysese in the following Examples and Comparative examples were carried out in the same manner as the above-mentioned.)

Comparative example 1

Example 1 was repeated except that 5 g of TMT alone was substituted for the composition. As a result, the mercury concentration in the filtrate was 37.5 ppb.

Comparative example 2

Example 1 was repeated except that 5 g of active carbon was substituted for the composition. As a result, the mercury concentration in the filtrate was 138 ppb.

Comparative example 3

Example 1 was repeated except that 2.5 g of TMT and 2.5 g of active carbon were substituted for the composition. As a result, the mercury concentration in the filtrate was 6.8 ppb.

EXAMPLES 2 – 4

TS, TET and TRA were employed as the dithiocarbamate compound, and each dithiocarbamate compound, a silica (particle size: 74μ or smaller) and active carbon were mixed together in given amounts shown in Table 2 to give the respective compositions. Subsequent procedure was carried out in the same manner as in Example 1. The mercury concentrations in the filtrates are shown in Table 2. Their mercury-removabilities were much superior.

Comparative examples 4 – 6

Examples 2 – 4 were repeated except that the respective dithiocarbamate compounds alone were substituted for the respective compositions. The results are shown in Table 2. The respective mercury-removabilities were much inferior to those in Examples 2 – 4.

Comparative examples 7 – 9

Examples 2 –4 were repeated except that the respective dithiocarbamate compounds and active carbon were substituted for the respective compositions of Examples 2 – 4. The results are shown in Table 2. The respective mercury-removabilities were inferior to those of Examples 2 – 4.

Table 2

| Blend amount Example | Dithiocarbamate compound Name | (g) | Silica (g) | AC* (g) | $Hg^{2+}$ concentration in filtrate (ppb) |
| --- | --- | --- | --- | --- | --- |
| Ex. 2 | TS | 2.0 | 0.5 | 2.5 | 0.5 |
| Comp. ex. 4 | " | 5 | 0 | 0 | 54 |
| Comp. ex. 7 | " | 2.5 | 0 | 2.5 | 8.9 |
| Ex. 3 | TET | 2.0 | 0.5 | 2.5 | 0.2 or lower |
| Comp. ex. 5 | " | 5 | 0 | 0 | 63 |
| Comp. ex. 8 | " | 2.5 | 0 | 2.5 | 13 |
| Ex. 4 | TRA | 2.0 | 0.5 | 2.5 | 0.4 |
| Comp. ex. 6 | " | 5 | 0 | 0 | 6 |

Table 2-continued

| Blend amount | Dithiocarbamate compound | Silica | AC* | $Hg^{2+}$ concentration in filtrate |
|---|---|---|---|---|
| Example Name (g) | (g) | (g) | | (ppb) |
| Comp. ex. 9  " | 2.5 | 0 | 2.5 | 3 |

Ex. : Example , Comp. ex. : Comparative example
*AC means active carbon powder.

Referential example 1

An experiment was carried out in the same manner as in Examples 2 – 4 except that a thiazol compound, N-cyclohexylbenzothiazyl 2-sulfenamide (which will be hereinafter abbreviated as CM) was substituted for the dithiocarbamate compounds. The mercury concentration in the filtrate was 216 ppb. The mercury-removability was inferior.

Referential example 2

An experiment was carried out in the same manner as in Comparative examples 4 – 6 except that CM alone was substituted for the dithiocarbamates. The mercury concentration in the filtrate was 2040 ppb. The mercury-removability was much inferior.

EXAMPLES 5 – 7

TMT, a silica (particle size: 74μ or smaller) and active carbon powder were mixed together in a ratio by weight of 4:1:5 to give a composition. Given amounts of this composition were added to 200 ml of mercuric chloride aqueous solution ($Hg^{2+}$ concentration: 40 ppm), and the resulting mixtures were stirred for 5 hours. The subsequent procedures were carried out in the same manner as in Example 1. By varying the addition amount of the composition for catching heavy metals, there were taken such experimental values that the remaining mercury concentrations could be distributed between about from 10 ppb to 1000 ppb (4 points or more), to prepare isothermal adsorption curves from these experimental values. From the curves, the equilibrium adsorption amounts at adsorption equilibrium concentrations of 1000, 100 and 10 ppb were read. The results are shown in Table 3. The equilibrium adsorption amounts were large and the adsorption amounts per unit weight were very large.

Table 3

| | No. | Composition | Adsorption equilibrium time (hr) | Adsorption equilibrium conc. ($Hg^{2+}$ ppb) | Equilibrium adsorption amount mg (Hg) / g (composition) | Effect of Silica and AC (in terms of ratio of equilibrium adsorption amounts) |
|---|---|---|---|---|---|---|
| Example | 5 | Mixture of TMT, silica and AC (4:1:5) | 5 | 1000 | 520 | E5/C10* 8.7 |
| | 6 | | 5 | 100 | 270 | E6/C11 11.7 |
| | 7 | | 5 | 10 | 160 | E7/C12 29.6 |
| Comp. ex. | 10 | TMT | 144 | 1000 | 60 | |
| | 11 | | 144 | 100 | 23 | |
| | 12 | | 144 | 10 | 5.4 | |
| | 13 | Mixture of ALM-125, silica and AC | 48 | 1000 | 150 | C13/C16 1.7 |
| | 14 | | 48 | 100 | 30 | C14/C17 1.3 |
| | 15 | | 48 | 10 | 5.4 | C15/C18 1.8 |
| | 16 | ALM-125 | 48 | 1000 | 88 | |
| | 17 | | 48 | 100 | 24 | |
| | 18 | | 48 | 10 | 3 | |
| | 19 | AC | 96 | 1000 | 17 | |
| | 20 | | 96 | 100 | 3.3 | |
| | 21 | | — | 10 | — | |

Note:
*"E5/C10" means a ratio of equilibrium adsorption amount of Example 5 to that of Comparative example 10. The meanings of E6/C11, E7/C12, C13/C16, C14/C17 and C15/C18 are similar to the above.

Comparative examples 10 – 12

Experiments were carried out in the same manner as in Examples 5 – 7 except that TMT alone was substituted for the composition and the adsorption equilibrium time was made 144 hours. The results are shown in Table 3. The equilibrium adsorption amounts are much smaller than those of Examples 5 – 7. In case of Examples 5 – 7 as compared thereto, the addition effectiveness of silica and active carbon to the dithiocarbamate compound is remarkable.

Comparative examples 13 – 15

Experiments were carried out in the same manner as in Examples 5 –7 except that an absorbent on sale, ALM-125 (a trade name of product manufactured by Nihon Soda, Japan) was substituted for TMT and the adsorption equilibrium time was made 48 hours. The results are shown in Table 3. The equilibrium adsorption amounts are much smaller than those of Examples 5 – 7.

Comparative examples 16 – 18

Experiments were carried out in the same manner as in Examples 5 – 7 except that ALM-125 was substituted for the compositin and the adsorption equilibrium time was made 48 hours. The results are shown in Table 3. The equilibrium adsorption amounts are much smaller than those of Examples 5 – 7. Further, in case of Examples 13 – 15 in comparison therewith, the addition effectiveness of silica and active carbon upon ALM-125 can be confirmed, but it is not so remarkable as the effectiveness upon TMT (Examples 5 - 7).

Comperative examples 19 – 21

Experiments were carried out in the same manner as in Examples 5 – 7 except that active carbon alone was substituted for the composition and the adsorption equilibrium hour was made 96 hours. The results are shown in Table 3 . The equilibrium adsorption amounts are much smaller.

EXAMPLE 8

TMT, silica (particle size: 74μ or smaller) and active carbon powder were mixed together in a ratio by weight of 4:1:5 to give a composition. Five g of this composition was added to 200 ml of mercuric chloride aqueous solution ($Hg^{2+}$ concentration: 40 ppm) and the resulting mixture was stirred for given times, followed by filtration with No. 5C filter paper to analyze the resulting filtrate. The mercury concentrations of the filtrate under variance of the stirring time are shown in Table 4. It is observed that the mercury adsorption rates are much higher.

Comparative example 22

Example 8 was repeated except that 5 g of TMT alone are 5 g of AC alone was substituted for the composition. The results are shown in Table 4. The adsorption rates are much lower than those of Example 8.

Table 4

| Stirring time (hr) | $Hg^{2+}$ concentration of treated water (ppb) | | |
|---|---|---|---|
| | Example 8 Mixture of TMT, silica and AC | Comparative ex. 22 | |
| | | TMT | AC |
| 2 | 2.9 | 128.4 | 173.2 |
| 5 | <0.2 | 37.5 | 138.0 |
| 10 | <0.2 | 36.3 | 71.0 |
| 24 | <0.2 | 48.9 | 5.2 |
| 48 | — | 5.9 | 1.6 |
| 96 | — | 14.9 | 0.2 |
| 144 | — | 0.4 | — |

EXAMPLE 9

Example 1 was repeated except that 0.5 g of the composition obtained in Example 1 was added to 100 ml of copper sulfate aqueous solution (copper ion concentration: 10 ppm), followed by stirring for 2 hours. As a result, the copper ion concentration in the filtrate was 0.5 ppm or lower.

EXAMPLE 10

Example 9 was repeated except that a potassium bichromate aqueous solution ($Cr^{6+}$ concentration: 10 ppm) was substituted for the copper sulfate aqueous solution. As a result, the Cr concentration in the filtrate was 1.7 ppm.

Referential example 3

TMT and an aqueous suspension of polyvinyl acetate in a ratio by weight of 29:81 were kneaded together, followed by drying at 60° C over night and thereafter crushing and sieving to give a granulated product of 18 - 40 mesh. Five ml of this product was packed in a column of 12 mm in inner diameter, through which a mercuric chloride aqueous solution ($Hg^{2+}$ concentration: 200 ppm) was passed at a SV of 5 $hr^{-1}$. The COD of the resulting effluent was observed. The results are shown in Table 5 in comparison with those in case of poly (ethylenethiuramdisulfide).

Table 5

| Ratio by volume of passed solution to granule ml/ml polymer | COD (ppm) | |
|---|---|---|
| | TMT | Poly(ethylenethiuramdisulfide) |
| 11 | <2.0 | 338 |
| 22 | <2.0 | 270 |
| 55 | <2.0 | 240 |
| 99 | <2.0 | 228 |

TMT is almost insoluble in water.

EXAMPLES 11 - 13

A composition obtained by mixing together TMT, silica (particle size: 74u or smaller) and active carbon powder (the same product employed in Example 1 ) in a ratio by weight of 4:1:5, was kneaded with an aqueous suspension of polyvinyl acetate (which will be hereinafter abbreviated as PVAc (S)) as a binder, followed by drying, crushing and sieving, under the conditions shown in Table 6 to give granulated products of 18 - 40 mesh.

The strengths and water resistant properties of these granulated products were observed. The results are shown in Table 6.

Table 6

| Ex. | Binder | Granulation condition (binder: composition: water) | Drying condition | Strength* | Water* resistant properties |
|---|---|---|---|---|---|
| 11 | PVAc(S) | 3:7:10 | 70° C warm air | A | A |
| 12 | " | 5:4:8 | " | A | A |
| 13 | " | 8:3:6 | " | A | A |

Note:
*Relative evaluations:
A — good;
B — a little good;
C — a little bad;
D — bad Note 1: Testing method for the strength A granulated product is loaded on a platform scale, and the product is lightly pushed by a glass rod from just thereabove and pressure is gradually applied. The reading of the pointer of the scale, when the product is crushed, is recorded. The procedure is repeated several times, and the average value (kg) is sought. When the average value is 2.0 kg or more, the product is redered A; when the value is 1.0 kg or more, the product, B; when the value is 0.5 kg or more, the product, C; and when the value is lower than 0.5 kg or less, the product, D.

Note 2: Testing method for water resistant properties

Thirty g of a granulated product and 300 c.c. of water are put in a 1l beaker and allowed to stand for one hour. Thereafter the contents are lightly stirred several times with a glass rod, followed by quietly separating water by filtration and drying. When the percentage of the product maintaining nearly the original form is 98% or higher, the product is rendered A; when the percentage is 90% or higher, the product, B; when the percentage is 50% or higher, the product, C; and when the percentage is lower than 50%, the product, D.

Comparative examples 23 - 35

Experiments were carried out in the same manner as in Example 11 except that various binders were substituted and conditions shown in Table 7 were employed. The results are shown in Table 7.

Table 7

| Comparative example | Binder | Granulation condition (Binder: composition: water) | Drying condition | Strength* | Water* resistant properties |
|---|---|---|---|---|---|
| 23 | Melamine resin adhesive | 2:7:8 | Natural | C | D |
| 24 | " | 4:5:8 | " | B | A |
| 25 | Phenol resin adhesive | 3:8:8 | " | C | D |
| 26 | " | 5:6:8 | " | B | A |
| 27 | Gypsum | 1:1:2 | " | B | D |
| 28 | " | 2:1:5 | " | B | D |
| 29 | " | 1:1:2 | 70° C warm air | A | D |
| 30 | " | 2:1:5 | " | A | D |
| 31 | PVAc(S) | 1:10:12 | " | C | C |
| 32 | [PVAc(S): gypsum] | (1:2):8:10 | " | B | C |
| 33 | " | (2:1):8:10 | " | B | B |
| 34 | (Urea resin adhesive: Hardening agent) | (3:0.4):7:8 | " | B | C |
| 35 | " | (5:0.6):5:8 | " | B | A |

Note:
*Relative evaluations, according to Table 6

EXAMPLE 14

0.5 g of the granulated product obtained in Example 11 was added to 100 ml of a mercuric chloride aqueous solution ($Hg^{2+}$ concentration: 0.873 ppm) and the resulting mixture was shaked for 2 hours, followed by separation by filtration with No. 5 filter paper and analysis of the resulting filtrate. As a result, the mercury concentration was 0.2 ppb or lower.

Comparative example 36

Experiments were carried out in the same manner as in Example 14 except that TMT, active carbon and a mixture of TMT with silica (ratio by weight: 4:1), each in an amount of 0.5 g, were respectively added to 100 ml of the mercuric chloride aqueous solution. The results are shown in Table 8.

Table 8

| | Original mercury concentration (ppm) | Mercury concentration of filtrate (ppb) |
|---|---|---|
| TMT | 0.873 | 0.8 |
| Active carbon powder | 1.07 | 8.7 |
| Mixture of TMT with silica (4:1) | 0.891 | 2.3 |

Comparative example 37

Example 14 was repeated except that a mixture of TMT with active carbon powder in a ratio by weight of 1:1 was employed. The mercury concentration of the filtrate was 0.6 ppb.

EXAMPLE 15

100 Ml of the granulated product obtained in Example 11 was packed in a glass column of 28 mm in inner diameter (a first column), through which a mercuric chloride aqueous solution ($Hg^{2+}$ concentration: 1 ppm) was then passed at a S.V. of 10. The resulting effluent was led to a second column packed with 50 ml of granular active carbon, to carry out mercury analysis at the exit of the second column.

Table 9

| Ratio by volume of passed solution to granule ml/ml | Amount of solution passed | First column Granu-* lated product | First column Hg of treated water (ppb) | Second column AC | Second column Hg of treated water (ppb) | Amount of mercury removed mg/$Hg^{2+}$/l | Amount of mercury removed mg/g (granulated product) |
|---|---|---|---|---|---|---|---|
| 50 | 5 | No change | 0.3 | No change | 0.5 | 50 | 0.114 |
| 240 | 24 | " | <0.2 | " | <0.2 | 240 | 0.545 |
| 480 | 48 | " | <0.2 | " | <0.2 | 480 | 1.091 |
| 960 | 96 | " | <0.2 | " | 0.3 | 960 | 2.182 |
| 1200 | 120 | " | <0.2 | " | <0.2 | 1200 | 2.727 |
| 1440 | 144 | " | 0.5 | " | <0.2 | 1440 | 3.273 |
| 1680 | 168 | " | 0.7 | " | <0.2 | 1680 | 3.818 |
| 1920 | 192 | " | <0.2 | " | <0.2 | 1920 | 4.364 |
| 2460 | 246 | Surface is slightly white | <0.2 | " | <0.2 | 2460 | 5.591 |

Table 9-continued

| Ratio by volume of passed solution to granule ml/ml | Amount of solution passed | First column Granulated* product | Hg of treated water (ppb) | Second column AC | Hg of treated water (ppb) | Amount of mercury removed mg/Hg$^{2+}$/l | mg/g (granulated product) |
| --- | --- | --- | --- | --- | --- | --- | --- |
| 2880 | 288 | " | <0.2 | " | <0.2 | 2880 | 6.545 |
| 3120 | 312 | " | <0.2 | " | <0.2 | 3120 | 7.091 |
| 3360 | 336 | " | 1.2 | " | 0.7 | 3360 | 5.136 |
| 3840 | 384 | " | 1.4 | " | 0.7 | 3840 | 8.727 |
| 5280 | 528 | " | 1.4 | " | 0.8 | 5280 | 12.000 |
| 11510 | 1151 | " | 3.2 | " | 2.1 | 11510 | 26.159 |
| 11990 | 1199 | " | 4.2 | " | 1.8 | 11990 | 27.068 |
| 14730 | 1473 | " | 6.4 | " | 0.9 | 14730 | 33.477 |

*Granulated product employed in Example 11

EXAMPLE 16

Example 11 was repeated except that 0.5 g of the granulated product obtained in Example 11 was added to 100 ml of 30% sulfuric acid aqueous solution (Hg$^{2+}$ concentration: 23 ppm). The mercury concentration in the filtrate was 3.2 ppb.

EXAMPLE 17

Example 11 was repeated except that the same 30% sulfuric acid aqueous solution as in Example 16 was neutralized with sodium hydroxide. The mercury concentration in the filtrate was 1.92 ppb.

EXAMPLE 18

0.5 Gram of the granulated product obtained in Example 11 was added to 100 ml of a copper sulfate aq. soln. (Cu ion conc.: 10 ppm), followed by stirring for 2 hours and analysis. The Cu ion concentration in the filtrate was 0.5 ppm or lower.

EXAMPLE 19

Example 18 was repeated except that 100 ml of potassium bichromate aqueous solution (Cr$^{6+}$ concentration: 10 ppm) was substituted for the copper sulfate aqueous solution of Example 18. The Cr concentration in the filtrate was 1.8 ppm.

Comparative example 38

70 Parts of the composition employed in Example 11 and 30 parts of 40% aqueous solution of carboxymethylcellulose (abbreviated as CMC) were mixed together, followed by drying, crushing and sieving to obtain 0.5 g of a granulated product of 18–40 mesh. Subsequent procedure was crried out in the same manner as in Example 14. The Hg concentration in the filtrate was 10.5 ppb.

Comparative example 39

Comparative example 38 was repeated except that an aqueous suspension of a styrene-methyl acrylate copolymer (Voncoat 5442, a trade name of product manufacutred by Dainihon Ink Kogyo Kabushiki Kaisha, Japan) was substituted for CMC. The Hg concentration in the filtrate was 14.2 ppb.

EXAMPLE 20

53.6 Parts by weight of a composition obtained by mixing together TMT, silica (particle size: 74 μ or smaller) and active carbon (the same product as in Example 1) in a ratio by weight of 14.6:30:36.0 were mixed with 21.4 parts by weight of a clay (obtained at Shokosan, Japan) and 30 parts by weight of bentonite, as excipients. To the resulting mixture were added 55 parts by weight of a polyvinyl acetate emulsion (abbreviated as PVAc (E); water content : 60%) and 8.6 parts by weight of water, followed by kneading with a kneader to obtain a blend having a water content of 29.4%, which was then supplied to the hopper of a screw type discharge extruder (outer diameter of screw, 60 mm; depth of thread groove of screw, 18 mm; diameter of die, 60 mm; scraper (4 blades; reverse pitches to those of screw; pitch angle, 30°), diameter of die orifice, 1.0 mm; number of die orifices, 82; motor (2700 rpm, 280 w); and reduction gear (reduction ratio, 1/50), to continuously extrude a blend in the form of vermicelli at a screw rate of 54 rpm. The formative stability and extrusion formability at that time are shown in Table 10. The blend was dried, disintegrated with a coffee mill, sieved by means of an upper sieve of 12 mesh and a lower sieve of 20 mesh for adjusting particle sizes and granulated into granules (cylindrical diameter, 1mm; length, 2–3 mm). The compression strength, water resistant property and Hg-removability of the granulated product were tested. The results are shown in Table 10.

EXAMPLES 21 – 23

Experiments were carried out in the same manner as in Example 20 except that clay alone was employed as excipient and the blend composition was varied. The results are shown in Table 10.

Comparative examples 40 – 41

Experiments were carried out in the same manner as in Example 20 except that bentonite alone was employed as excipient and the blend compositions shown in Table 10 were employed. The results are shown in Table 10.

Comparative example 42

Example 20 was repeated except that no excipient was employed and the blend composition shown in Table 10 was employed. The results are shown in Table 10.

Comparative example 43

Example 20 was repeated except that clay was employed as excipient and the blend composition shown in Table 10 was employed. The results are shown in Table 10.

Comparative example 44

Example 22 was repeated except that no scraper was employed. The results are shown in Table 10.

Table 10

| | Extrusion condition | | | | | | | | | |
|---|---|---|---|---|---|---|---|---|---|---|
| | Blend composition (part by weight) | | | | | Binder | | | Water content of Blend (%) | Scraper |
| | Composition | | | Excipient | | | water | | | |
| No. | TMT | Silica | AC | Clay | BNT[1] | PVAC (E) | content | Water | | |
| Example 20 | 14.6 | 3.0 | 36.0 | 21.4 | 3.0 | 22.0 | 33.0 | 8.6 | 29.4 | Provided |
| " 21 | 15.2 | 1.2 | 39.3 | 20.3 | 0 | 24.0 | 36.0 | 4.8 | 29.0 | " |
| " 22 | 13.0 | 13.0 | 13.0 | 43.6 | 0 | 17.4 | 26.1 | 17.0 | 30.1 | " |
| " 23 | 14.2 | 19.2 | 14.2 | 33.4 | 0 | 19.0 | 28.5 | 15.4 | 30.5 | " |
| Comparative Ex. 40 | 26.9 | 0 | 26.9 | 0 | 23.1 | 23.1 | 34.7 | 10.2 | 31.0 | " |
| " 41 | 36.4 | 3.0 | 33.4 | 0 | 12.5 | 12.5 | 18.8 | 24.1 | 30.0 | " |
| " 42 | 45.8 | 4.0 | 41.8 | 0 | 0 | 8.4 | 12.6 | 30.1 | 29.9 | " |
| " 43 | 13.8 | 13.8 | 37.4 | 18.5 | 0 | 16.5 | 24.8 | 17.7 | 29.8 | " |
| " 44 | 13.0 | 13.0 | 13.0 | 43.6 | 0 | 17.4 | 26.1 | 17.0 | 30.1 | Absent |

| | Properties of granulated product | | | | |
|---|---|---|---|---|---|
| | Formability | | Compression strength (Kg) | Water resistant Property | Hg-removability (ppb) |
| No. | Extrusion formability | Formative stability | | | |
| Example 20 | Good | Good | 5 or higher | 65° | 0.2 or less |
| " 21 | " | " | " | 70° or higher | 0.2 |
| " 22 | " | " | " | 70° | 0.4 |
| " 23 | " | " | " | 70° | 0.9 |
| Comparative ex. 40 | " | " | 1.5 | 10° | 0.2 or less |
| " 41 | Bad*2 | Bad*3 | — | — | — |
| " 42 | "*4 | " | — | — | — |
| " 43 | "*2 | "*5 | 5 or higher | 70° | 0.7 |
| " 44 | "*6 | " | — | — | — |

[1]BNT: Bentonite
[2]Extrusion pressure increased
[3]No cylindrical form obtained
[4]Heat generated at screw part
[5]Cracked on surface
[6]Extrusion impossible The testing methods for the properties of granulated product and formability shown in Table 10 are as follows:

Compression strength

One granule of a granulated product is placed on an upper dish spring scale and compressed in the vertical direction, and the reading of the spring scale at the time of break of the granule is observed.

Water resistant property 0.5 Gram of a granulated product together with 100 ml of water are placed in a 250 ml polyethylene sample bottle, and placed on a ball mill rotating machine, and stirred for 4 hours, followed by separation by filtration with a 40 mesh sieve. The transparency of resulting filtrate is measured according to the method of transparency test of JIS K0102 (the larger the number, the better the water resistant property).

Hg-removability 0.5 Gram of a granulated product is added to 100 ml of a mercuric chloride aqueous solution (adjusted to a $Hg^{2+}$ concentration of 1.0 ppm), followed by stirring for 2 hours and separation by filtration with No. 5 filter paper. The Hg concentration of the resulting filtrate was analyzed.

Extrusion formability

When a blend is continuously extruded uniformly through even any of the die orifices into the form of vermicelli; the screw part does not generate any heat; no overload is applied on the motor; and the extrusion efficiency is good, the blend is rendered "good," while, when a blend is not provided with the above-mentioned conditions, the blend is rendered "bad."

Formative stability

When a blend has been extruded into the form of vermicelli and the resulting extrudate is brittle or has cracks or deficiencies in the cross-sectional shape or adheres to each other or is extremely deformed into a snake form or is crumbled in the shape by flowing, such materials are rendered "bad:," while other materials are rendered "good".

What is claimed is:

1. An agent for removing mercury from waste waters containing the same, which consists essentially of
   (a) a compound which is characterized by the general formula:

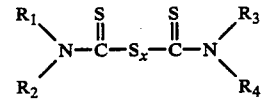

wherein $R_1$, $R_2$, $R_3$, and $R_4$ are each either a hydrogen atom or an alkyl having 1 – 3 carbon atoms, and ($R_1$ and $R_2$) and ($R_3$ and $R_4$) can form a ring together with the terminal nitrogen atom, respectively, and x is an integer of 1 – 4,
   (b) amorphous silica and
   (c) active carbon powder,
      the ratio by weight of said compound to said amorphous silica being in the range of 20:1 – 1:2, and
      the ratio by weight of said compound to said active carbon powder being in the range of 10:1 – 1:10.

2. An agent according to claim 1 wherein (a) is bis-dimethyl-thio-carbamoyl-monosulfide.

3. An agent according to claim 1 wherein (a) is bis-diethyl-thio-carbamoyl-disulfide.

4. An agent according to claim 1 wherein (a) is bis-pentamethylene-thio-carbamoyl-tetrasulfide.

5. An agent according to claim 1 wherein (a) is bis-dimethyl-thio-carbamoyl-disulfide.

6. A granular agent for removing mercury from waste waters containing the same, which consists essentially of
(a) a compound characterized by the general formula:

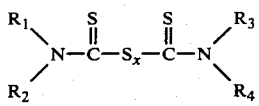

wherein $R_1$, $R_2$, $R_3$ and $R_4$ are each either a hydrogen atom or an alkyl having 1 – 3 carbon atoms, and ($R_1$ and $R_2$) and ($R_3$ and $R_4$) can form a ring together with the terminal nitrogen atom, respectively, and x is an integer of 1 – 4,
(b) amorphous silica,
(c) active carbon powder, and
(d) a binder composed of a vinyl acetate polymer resin,
the ratio by weight of said compound to said active carbon powder being in the range of 10:1 – 1:10,
the ratio by weight of said compound to said amorphous silica being in the range of 20:1 – 1:2, and
the content of said vinyl acetate polymer resin in the granular agent being in the range of 5 – 70% by weight.

7. An agent according to claim 6 wherein (a) is bis-dimethyl-thio-carbamoyl-monosulfide.

8. An agent according to claim 6 wherein (a) is bis-diethyl-thio-carbamoyl-disulfide.

9. An agent according to claim 6 wherein (a) is bis-pentamethylene-thio-carbamoyl-tetrasulfide.

10. An agent according to claim 6 wherein (a) is bisdimethyl-thio-carbamoyl-disulfide.

11. A method for producing a granular agent for removing mercury which comprises kneading a composition consisting essentially of
(a) a compound characterized by the general formula:

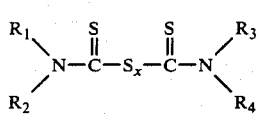

wherein $R_1$, $R_2$, $R_3$ and $R_4$ are each either a hydrogen atom or an alkyl having 1 – 3 carbon atoms, and ($R_1$ and $R_2$) and ($R_3$ and $R_4$) can form a ring together with the terminal nitrogen atom, respectively, and x is an integer of 1 – 4,
(b) amorphous silica,
(c) active carbon powder, and
(d) an excipient comprising clay and a binder consisting essentially of a vinyl acetate polymer resin,
to thereby obtain a blend having a water content of 25 – 35% by weight, and extruding the blend into granules,
the content of said vinyl acetate polymer resin in said blend being in the range of 5% – 40% by weight (based on the % by weight of dried blend) and the ratio by weight of the total of (a), (b) and
(c) to said excipient being in the range of 1:6 – 6.2.

12. A method according to claim 11 wherein (a) is bisdimethyl-thio-carbamoyl-monosulfide.

13. A method according to claim 11 wherein (a) is bisdiethyl-thio-carbamoyl-disulfide.

14. A method according to claim 11 wherein (a) is bispentamethylene-thil-carbamoyl-tetrasulfide.

15. A method according to claim 11 wherein (a) is bisdimethyl-thio-carbamoyl-disulfide.

16. A method according to claim 11 wherein the ratio by weight of said compound to said amorphous silica is in the range of 20:1 – 1:2, and the ratio by weight of said compound to said active carbon powder is in the range of 10:1 – 1:10.

17. A method according to claim 11 wherein said excipient consists of clay.

18. A method according to claim 11 wherein said excipient consists of 10 parts by weight of a clay and 2 parts by weight or less of bentonite.

19. A method according to claim 11 wherein said extrusion into granules is carried out by means of a screw type discharge extrusion where between a die and a screw is fixed a scraper provided with several blades of reverse pitches to the screw and rotated in the same direction as that of the screw.

20. A method for removing mercury from a liquid solution which comprises contacting the liquid solution with the granular agent set forth in claim 6.

21. A method according to claim 20 wherein a column having said granular agent packed therein and a column having active carbon powder packed therein are connected in series and waste water is passed through to thereby remove mercury contained in the waste water.

* * * * *